United States Patent
Ramstein et al.

(10) Patent No.: US 7,419,364 B2
(45) Date of Patent: Sep. 2, 2008

(54) NOSE CONE FOR A TURBOMACHINE

(75) Inventors: Edouard Marie Gabriel Ramstein, Vaux le Penil (FR); Yann Pascal Raymond Rene Lebret, Maincy (FR)

(73) Assignee: SNECMA, Paris (FR)

( * ) Notice: Subject to any disclaimer, the term of this patent is extended or adjusted under 35 U.S.C. 154(b) by 495 days.

(21) Appl. No.: 11/188,737

(22) Filed: Jul. 26, 2005

(65) Prior Publication Data

US 2006/0056977 A1    Mar. 16, 2006

(30) Foreign Application Priority Data

Jul. 28, 2004    (FR)    ................................. 04 08338

(51) Int. Cl.
*F02C 7/05*    (2006.01)
*F02C 7/057*    (2006.01)

(52) U.S. Cl. ............... 416/245 R; 416/246; 416/247 R; 415/121.2; 415/218.1; 60/39.092; 137/15.1

(58) Field of Classification Search .............. 415/121.2, 415/131–132, 157, 218.1, 219.1; 416/149–150, 416/157 R, 245 R, 245 A, 246, 247 R; 60/39.092, 60/39.093; 137/15.1, 15.2; 244/53 B
See application file for complete search history.

(56) References Cited

U.S. PATENT DOCUMENTS

| 3,176,462 A | | 4/1965 | Eckert |
| 3,196,598 A | * | 7/1965 | Olson ...................... 415/121.2 |
| 3,495,605 A | | 2/1970 | Gunnarson et al. |
| 5,148,673 A | | 9/1992 | Enderle |
| 6,089,824 A | * | 7/2000 | Soares ...................... 415/121.2 |

FOREIGN PATENT DOCUMENTS

GB    1 427 339    3/1976

* cited by examiner

*Primary Examiner*—Christopher Verdier
(74) *Attorney, Agent, or Firm*—Oblon, Spivak, McClelland, Maier & Neustadt, P.C.

(57) ABSTRACT

A nose cone for a turbomachine, such as a turbojet in particular, the cone being mounted on the end of a shaft carrying fan blades and being associated with a controlled axial displacement mechanism, thereby making it possible to modify the axial position of the cone relative to the fan blades.

5 Claims, 1 Drawing Sheet

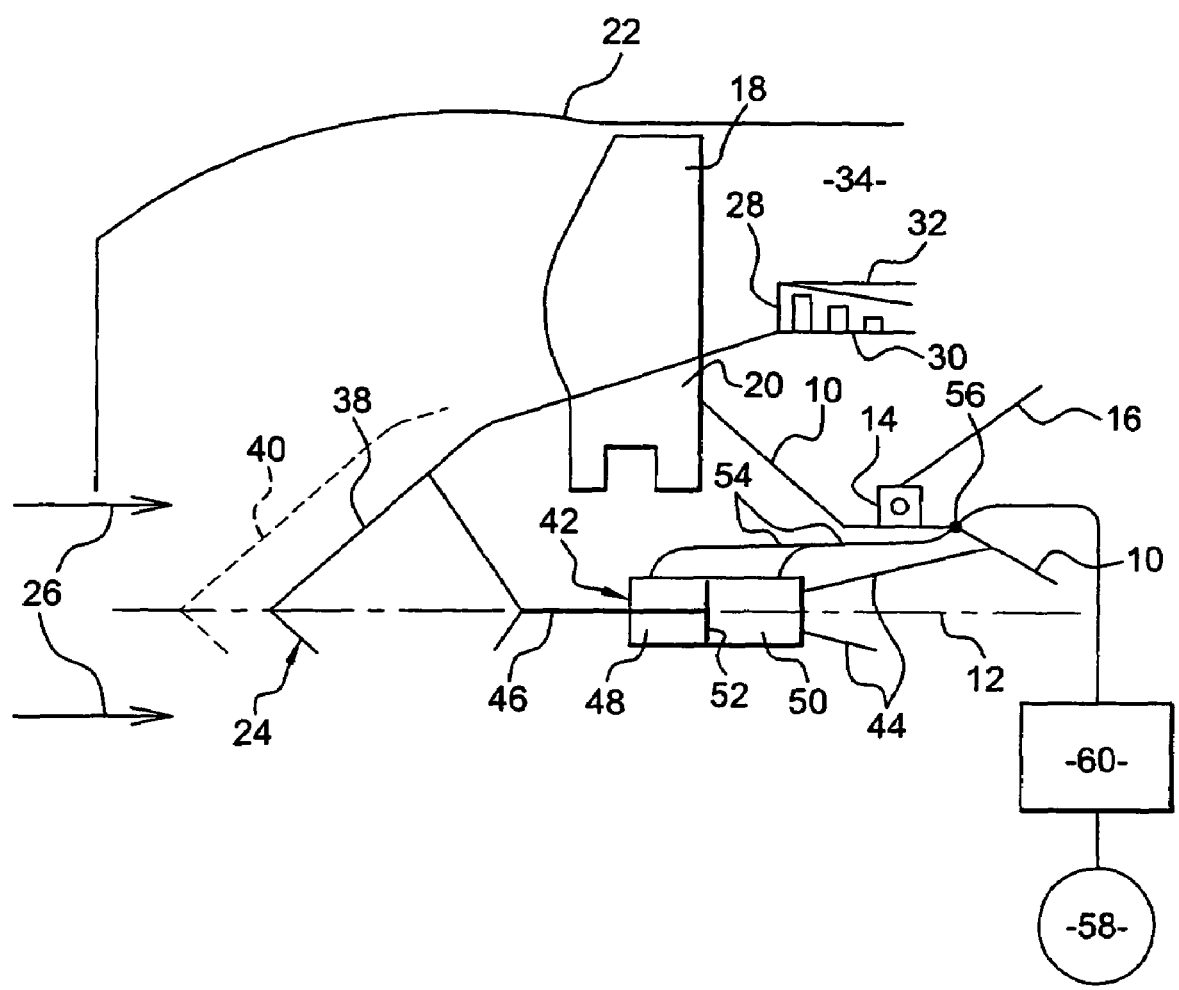

NOSE CONE FOR A TURBOMACHINE

The present invention relates to a nose cone for a turbomachine, such as a turbojet in particular.

BACKGROUND OF THE INVENTION

At its upstream end, a turbojet has an air inlet feeding both a fan and a compressor having blades that are carried by disks secured to a shaft that extends over a major fraction of the turbojet and that is driven in rotation by a turbine of the turbojet.

A nose cone is mounted on the upstream end of the shaft so that a fraction of the flow of air that penetrates inside the turbojet is deflected towards the blades of the fan, the flow then being separated into a primary flow which passes through an admission orifice of the compressor, and into a secondary flow which flows around the compressor, and which is then mixed with the primary flow, and/or feeds cooling circuits for cooling components of the turbojet.

In the prior art, the nose cone is mounted in stationary manner on the end of the shaft, and its shape and its dimensions are determined so as to optimize the angles of incidence of the air at the roots of the fan blades for a given flight stage.

The shape and the dimensions of the nose cone are also determined so as to provide protection against the ingestion of ice and of solid objects or particles.

The shape and dimensions chosen for the nose cone are therefore the result of a compromise between those two relatively contradictory constraints, and they therefore do not really satisfy either of those two constraints.

OBJECTS AND SUMMARY OF THE INVENTION

A particular object of the invention is to provide a simple, low cost, and effective solution to that problem.

The invention provides a turbomachine nose-cone which enables the angle of incidence of the air at the roots of the fan blades to be optimized for different stages of flight, while ensuring effective protection against the ingestion of ice and of solid objects or particles.

To this end, the invention proposes a nose cone for a turbomachine, such as a turbojet in particular, the cone being mounted on the end of a shaft carrying fan blades and serving to control the angle of incidence of an incoming airflow at the roots of the fan blades, the cone being mounted on the above-mentioned shaft by controlled axial displacement means, thereby making it possible to modify the axial position of said cone relative to the fan blades.

Axially displacing the nose cone on the end of the above-mentioned shaft enables the angle of incidence of the air at the roots of the fan blades to be modified and optimized for different stages of flight, and provides better protection against the ingestion of ice and of solids.

During takeoff, and by way of example, the nose cone is axially displaced into a forward position relative to the fan blades, so as to deflect ice and solids outwards as far as possible.

In flight, the nose cone can be displaced axially back from the above-mentioned forward position to one or more set-back positions, so as to adapt the angle of incidence at the roots of the fan blades, and optimize said angle as a function of flying conditions.

In a preferred embodiment of the invention, the cone is connected to the above-mentioned shaft by a hydraulic actuator having a cylinder that is secured to the end of the shaft and having a piston rod that carries the cone.

The controlled means for axial displacement of the cone are carried by the shaft, and are driven in rotation together with the nose cone and the fan blades. Said control means are connected to rotary hydraulic fluid feed means comprising a source of hydraulic fluid under pressure and regulator means for regulating the pressure.

The axial position of the nose cone is determined by regulating the pressure in the hydraulic actuator. Such axial-displacement control means have the advantage of being simple to make and implement.

The invention also proposes a turbomachine such as a turbojet, said turbomachine including a nose cone of the type described above.

BRIEF DESCRIPTION OF THE DRAWING

Other advantages and characteristics of the invention appear on reading the following description given by way of non-limiting example and with reference to the accompanying drawing which is a highly diagrammatic half-view in axial section of the front portion of a turbojet fitted with a nose cone of the invention.

MORE DETAILED DESCRIPTION

The turbojet shown in the drawing has a shaft 10 that is driven in rotation about its axis 12 by a turbine mounted at the outlet from a combustion chamber, the shaft 10 being centered and guided in rotation by bearings 14 mounted on portions 16 of the stator of the turbojet.

At its upstream end, the shaft 10 carries a plurality of fan blades 18 having radially inner ends 20 that are secured in conventional manner onto the periphery of a frustoconical portion of the shaft 10.

The fan blades 18 are surrounded on the outside by a substantially cylindrical duct 22 which enables an incoming flow of air to be channeled into the turbojet.

A nose cone 24 is mounted on the upstream end of the shaft 10 and is connected to the frustoconical portion of the shaft carrying the fan blades 18, so as to deflect the central portion 26 of the incoming airflow towards the blades 18.

Immediately downstream from the fan blades 18, there is an annular orifice 28 for admitting air into a compressor having blades that are carried by a portion 30 of the shaft 10 and that are housed in a cylindrical outer casing 32, which co-operates with the inside surface of the duct 22 to define an annular space 34.

The air that penetrates into the annular orifice 28 of the compressor forms a primary flow that is compressed by the compressor of the turbojet, then mixed with fuel and burnt in a combustion chamber, on leaving which it provides power to the moving blades of the turbine that drives the shaft 10 in rotation. The air that passes into the annular space 34 forms a secondary flow for mixing with the primary flow so as to cool various components of the turbojet, and it can also serve to increase the thrust of the turbojet.

In the prior art, the nose cone is stationary at the end of its shaft, and its shape and dimensions are determined so as to optimize the angle of incidence of the air at the roots of the fan blades 18 for some given stage of flight, the nose cones should also enable solids and particles to be deflected outwards.

In the invention, the nose cone 24 is mounted so as to be axially displaceable along the axis 12 of the shaft 10 by control means carried by the shaft 10 and designed to modify the axial position of the cone 24 relative to the fan blades 18.

The nose cone 24 is thus displaceable between a set-back position 38, shown by continuous lines, which can be the prior-art stationary position or another position set further back, and a forward position 40, shown by dashed lines, which increases the outward deflection of air and of solids and particles relative to the axis of rotation 10. The nose cone 24 can also be positioned in predetermined intermediate positions between the forward position 40 and the furthest back position 38.

In the embodiment shown, the control means for controlling axial displacement of the nose cone 24 comprise a hydraulic actuator 42 having a cylinder that is secured to the shaft 10 by appropriate means 44 and that extends axially, and having a piston rod 46 that extends axially upstream and that is connected to the nose cone 24 to displace it axially.

The hydraulic actuator 42 comprises both an upstream chamber 48 and a downstream chamber 50 for receiving hydraulic fluid, said chambers being separated in leaktight manner by the piston 52 of the actuator, and being fed with hydraulic fluid via ducts 54 connected to rotary couplings 56 that are mounted on the shaft 10, and that are themselves fed from a pressurized hydraulic fluid circuit 58 including regulator means 60 for regulating the pressure, the pressure-regulator means 60 and the circuit 58 being carried by the stator of the turbojet.

The device of the invention operates as follows: For take-off, the chamber 50 of the actuator 42 is fed with hydraulic fluid coming from the source 58, so that the piston 52 is displaced upstream, taking with it the nose cone 24 that is carried by the piston rod 46, until it reaches the forward position 40 in which solids and particles present in the air are deflected outwards as far as possible relative to the axis of rotation 12. In flight, the pressures in the chambers 48, 50 of the actuator 42 are adjusted so that the piston 52 moves the nose cone into the set-back position 38, or into an intermediate position between the above-mentioned forward position 40 and the set-back position 38, so as to optimize the angle of incidence of the air at the roots of the fan blades 18 for the particular stage of flight.

What is claimed is:

1. A nose cone for a turbomachine, the cone being mounted on the end of a shaft carrying fan blades and serving to control the angle of incidence of an incoming airflow at the roots of the fan blades, the cone being mounted on said shaft by controlled axial displacement means, thereby making it possible to modify the axial position of said cone relative to the fan blades, wherein the nose cone is connected to said shaft by a hydraulic actuator having a cylinder that is secured to the end of the shaft and having a piston rod that carries the cone.

2. A nose cone according to claim 1, wherein the nose cone is axially displaceable between a forward position for providing protection against the ingestion of solids and particles, and a set-back position for optimizing the angle of incidence of the air at the roots of the blades of the fan.

3. A nose cone according to claim 1, wherein the hydraulic actuator is connected to rotary hydraulic fluid feed means.

4. A nose cone according to claim 3, wherein the hydraulic feed means comprise a source of hydraulic fluid under pressure and regulator means for regulating the pressure.

5. A turbomachine including a nose cone according to claim 1.

* * * * *